(12) United States Patent
Ishino et al.

(10) Patent No.: US 9,648,179 B2
(45) Date of Patent: May 9, 2017

(54) SCREEN IMAGE PROVIDING APPARATUS, SCREEN IMAGE PROVIDING METHOD, AND COMPUTER READABLE MEDIUM

(71) Applicant: FUJI XEROX CO., LTD., Tokyo (JP)

(72) Inventors: Shigeki Ishino, Yokohama (JP); Teppei Aoki, Kamakura (JP); Takahiro Okayasu, Sagamihara (JP); Shinichiro Yamamoto, Kawasaki (JP); Masamune Oshitani, Shibuya (JP); Russell Neville, Portland, OR (US)

(73) Assignee: FUJI XEROX CO., LTD., Tokyo (JP)

( * ) Notice: Subject to any disclaimer, the term of this patent is extended or adjusted under 35 U.S.C. 154(b) by 45 days.

(21) Appl. No.: 14/657,288

(22) Filed: Mar. 13, 2015

(65) Prior Publication Data
US 2016/0224286 A1 Aug. 4, 2016

(30) Foreign Application Priority Data
Feb. 4, 2015 (JP) ................................ 2015-020656

(51) Int. Cl.
*G06F 3/12* (2006.01)
*H04N 1/00* (2006.01)
(52) U.S. Cl.
CPC ....... *H04N 1/0035* (2013.01); *H04N 1/00464* (2013.01)
(58) Field of Classification Search
None
See application file for complete search history.

(56) References Cited

U.S. PATENT DOCUMENTS 7,263,661 B2 8/2007 Chavers et al.
7,765,248 B2 * 7/2010 Kanasaki ............ G06F 17/3089
358/1.15

(Continued)

FOREIGN PATENT DOCUMENTS

JP 2012-037928 A 2/2012
JP 2012-191321 A 10/2012

OTHER PUBLICATIONS

Office Action (Patent Examination Report) dated Jun. 24, 2016, issued by the Australian Patent Office in counterpart Australian Application No. 2015201626.

*Primary Examiner* — Paul F Payer
(74) *Attorney, Agent, or Firm* — Sughrue Mion, PLLC

(57) ABSTRACT

There is provided an operation screen providing system including a relay apparatus and an operation screen providing apparatus. A function providing unit provides an additional function which is not inherent of a processing apparatus, to the processing apparatus. A requesting unit that requests an operation screen providing apparatus for an operation screen for the processing apparatus, if an operation screen request is received from the processing apparatus. A providing unit that receives operation screen information including screen information for receiving an instruction relative to a function of the processing apparatus and screen information for receiving an instruction relative to the additional function which the relay apparatus provides, from the operation screen providing apparatus in response to the request of the requesting unit, and provides the received operation screen information to the processing apparatus.

9 Claims, 8 Drawing Sheets

(56) References Cited

U.S. PATENT DOCUMENTS

| | | | |
|---|---|---|---|
| 8,428,484 B2* | 4/2013 | Plewnia | G03G 21/02 358/1.13 |
| 8,464,146 B2 | 6/2013 | Kang | |
| 2005/0179961 A1* | 8/2005 | Czyszczewski | H04N 1/00411 358/468 |
| 2012/0033257 A1* | 2/2012 | Okazawa | H04L 41/0803 358/1.15 |
| 2012/0233537 A1 | 9/2012 | Kawabata | |
| 2012/0314245 A1* | 12/2012 | Nakashima | H04N 1/00244 358/1.15 |
| 2013/0019160 A1* | 1/2013 | Bando | H04N 1/00244 715/234 |
| 2014/0247465 A1 | 9/2014 | Tsujimoto | |

* cited by examiner

FIG. 2

| RELAY APPARATUS | ADMINISTRATOR ID (EMAIL ADDRESS) | GROUP (MANAGEMENT UNIT) | APPARATUS NAME | TYPE (MODEL) | COUNT VALUE | STATE |
|---|---|---|---|---|---|---|
| 0001 | Yamamoto@example.com | AB DEVELOPMENT DEPARTMENT ON 7TH FLOOR | PRINTER-A | Prt123 | 1250 SHEETS | NORMAL |
| | | | PRINTER-B | Prt124 | 945 SHEETS | OUT OF TONER |
| 0002 | Yamamoto@example.com | AB DEVELOPMENT DEPARTMENT ON 8TH FLOOR | PRINTER-P | Prt125 | 789 SHEETS | OUT OF ORDER |
| | | | PRINTER-Q | Prt123 | 345 SHEETS | NORMAL |
| | | | PRINTER-R | Prt123 | 456 SHEETS | SLEEP MODE |
| 0023 | Suzuki@example.com | ADMINISTRATION DEPARTMENT | PRINTER-X | Prt125 | 235 SHEETS | OUT OF ORDER |
| | | | PRINTER-Y | Prt124 | 468 SHEETS | NORMAL |
| | | | | | | |

FIG. 6

| TYPE OF MANAGEMENT OBJECT APPARATUS | TYPE OF Web-UI |
|---|---|
| MULTI-FUNCTION APPARATUS A | TYPE A |
| MULTI-FUNCTION APPARATUS B | TYPE B |
| MULTI-FUNCTION APPARATUS C | NONE |
| ... | ... |

FIG. 9

| TYPE OF RELAY APPARATUS | TYPE OF MANAGEMENT OBJECT APPARATUS | TYPE OF Web-UI |
|---|---|---|
| RELAY 1 | MULTI-FUNCTION APPARATUS A | TYPE 1-A |
| RELAY 1 | MULTI-FUNCTION APPARATUS B | TYPE 1-B |
| RELAY 2 | MULTI-FUNCTION APPARATUS A | TYPE 2-A |
| RELAY 2 | MULTI-FUNCTION APPARATUS B | TYPE 2-B |
| ... | ... | ... |

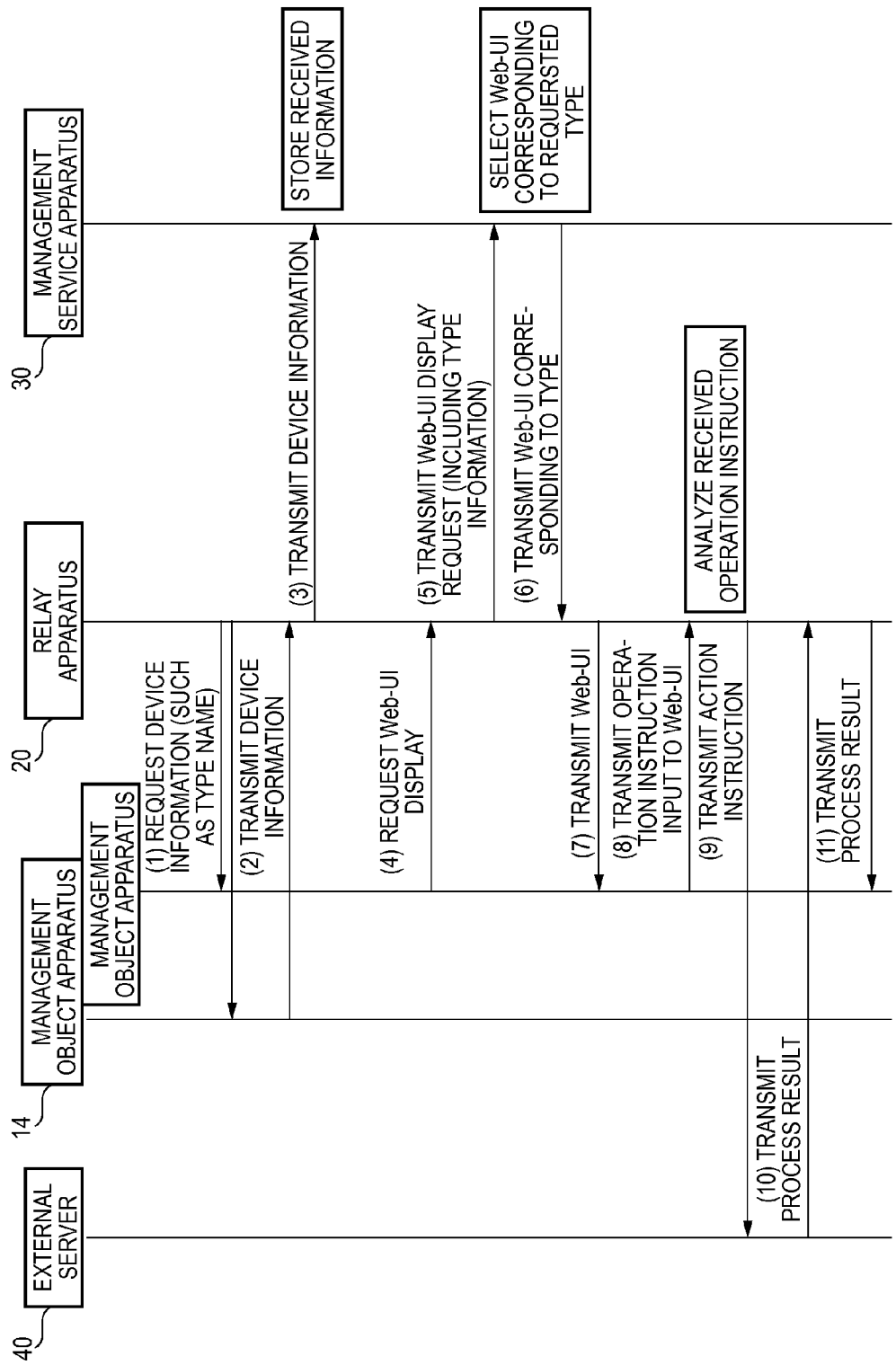

SCREEN IMAGE PROVIDING APPARATUS, SCREEN IMAGE PROVIDING METHOD, AND COMPUTER READABLE MEDIUM

CROSS-REFERENCE TO RELATED APPLICATIONS

This application is based on and claims priority under 35 U.S.C. §119 from Japanese Patent Application No. 2015-020656 filed on Feb. 4, 2015.

TECHNICAL FIELD

The present invention relates to an operation screen providing system, a relay apparatus, an operation screen providing apparatus, an operation screen providing method and programs.

SUMMARY

According to an aspect of the exemplary embodiments of the present invention, there is provided an operation screen providing system comprising: a relay apparatus and an operation screen providing apparatus, wherein the relay apparatus includes: function providing means for providing an additional function which is not inherent of a processing apparatus, to the processing apparatus, requesting means for requesting the operation screen providing apparatus for an operation screen the processing apparatus, if an operation screen request is received from the processing apparatus; and providing means for providing operation screen information received from the operation screen providing apparatus in response to a request of the requesting means, to the processing apparatus, wherein the operation screen providing apparatus includes screen information providing means for providing, in a case where an operation screen for the processing apparatus is requested by the relay apparatus, the operation screen information including screen information for receiving an instruction relative to a function of the processing apparatus and screen information for receiving an instruction relative to the additional function which the relay apparatus provides, to the relay apparatus.

BRIEF DESCRIPTION OF THE DRAWINGS

Exemplary embodiments of the present invention will be described in detailed based on the following figures, wherein:

FIG. 2 is a view illustrating an example of data which a database of a management service contains;

FIG. 6 is a view illustrating an example of correspondence relation information which is for acquiring a Web-UI and is provided to the management object apparatus;

FIG. 7 is a view illustrating the flow of the UI screen providing method of the embodiment;

FIG. 9 is a view illustrating an example of correspondence relation information which is for acquiring Web-UIs and is provided to the management object apparatus, on the assumption that relay apparatuses can provide different additional functions, respectively.

DETAILED DESCRIPTION

<Example of System Configuration>

Figure 1:
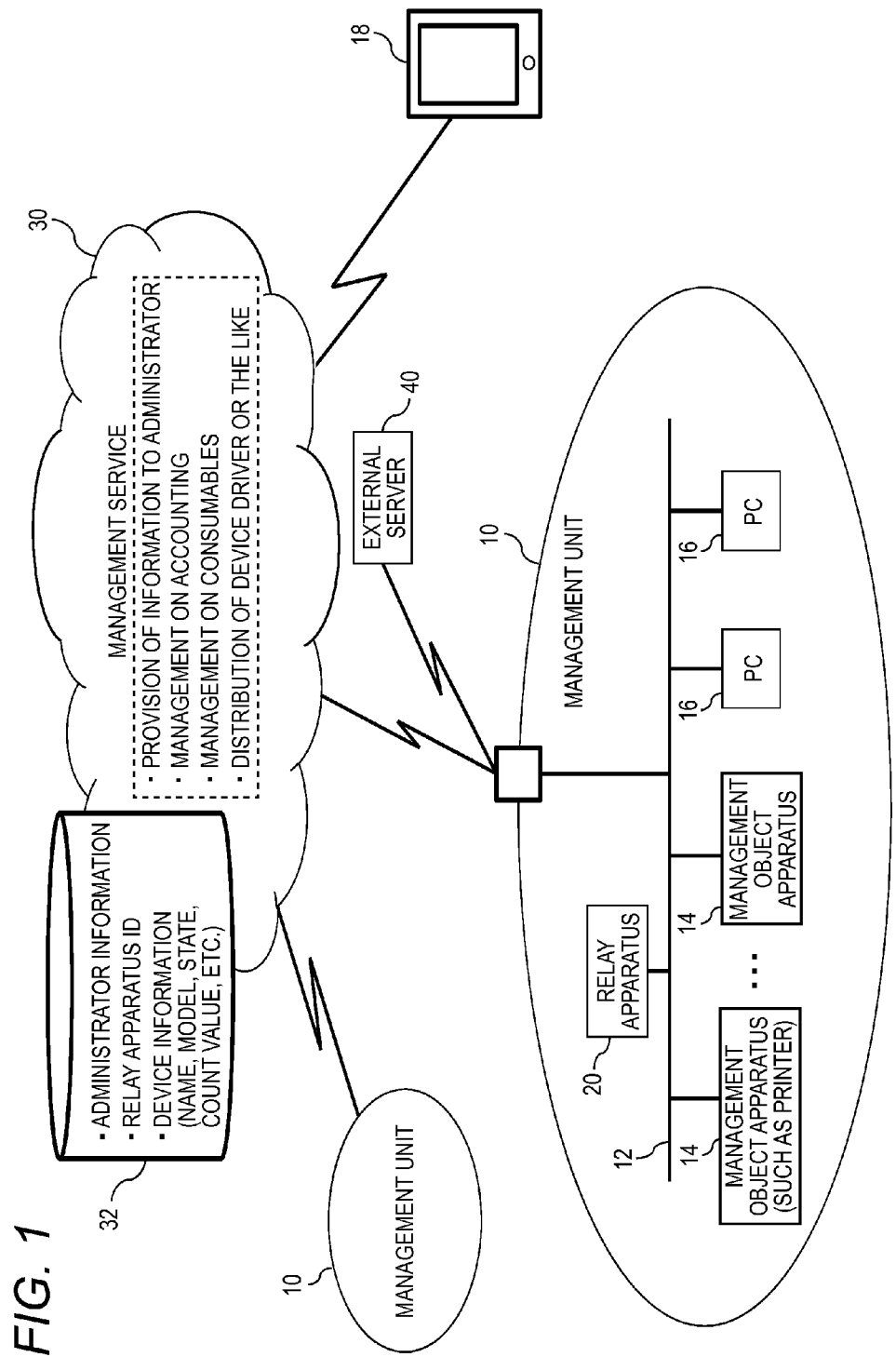
FIG. 1 is a view illustrating an example of a system to which a UI screen providing method of an embodiment is applied.

An example of a system to which a UI screen providing method of an embodiment of the present invention is applied will be described with reference to FIG. 1.

This system includes relay apparatuses 20 which are installed inside management units 10, respectively, and a management service 30 which is installed outside the management units 10.

Each management unit 10 is a collection of apparatuses such as computers which perform data communication through a local network 12 such as one local area network (LAN) or an intranet (or may be a group of users using those apparatuses), and may be one office, one factory, one home, or the like. Each relay apparatus 20 is connected to a corresponding local network 12. Further, one or more management object apparatuses 14 and one or more personal computers (PC) 16 are connected to each local network 12. Each local network 12 may use a wired scheme or a wireless scheme, or may use a combination of them. Each local network 12 is connected to the Internet (not shown) through a firewall, a gateway or the like.

Each management object apparatus 14 is a processing apparatus to be a management object of this system. The processing apparatus is an apparatus that performs one or more predetermined processes for the user, displays the operation screen (user interface screen), and receives operation instructions for the one or more processes using the operation screen. One example of the processing apparatus is an image forming apparatus. A concept of image forming apparatus includes various apparatuses which print images on media, or form electronic image data (by reading documents) (those apparatuses may further transmit the electronic image data), like a printer, a multi-function apparatus (a multi-function apparatus having the functions of a copy machine, a printer, a scanner, and the like), a scanner, and a facsimile. Also, to each local network 12, management object apparatuses 14 of various kinds and various models (types) can be connected. The PCs 14 use those management object apparatuses 14 through the local networks 12.

Each relay apparatus 20 collects information necessary for management, from each management object apparatus 14 on a corresponding local network 12, and provides the collected information to the management service 30. Also, each relay apparatus 20 may have a function of receiving an updated version of firmware for each of the models of the management object apparatuses 14 located on a corresponding local network 12, or updated versions of device drivers such as a printer driver necessary for the PCs 16 located on the corresponding local network 12 to control each model, from the management service 30. In this case, if a relay apparatus 20 receives an updated version of firmware or an updated version of a device driver, the relay apparatus 20 stores the received updated version in order to install the received updated version in a management object apparatus 14 or a PC 16 corresponding to the received updated version.

It also can be considered a case of using, as each relay apparatus 20, a PC 16 connected to a corresponding local network 12 and having a program installed therein for implementing the function (to be described in this specification) of the corresponding relay apparatus 20. However, in the present embodiment, as an example, the relay apparatuses 20 designed as dedicated apparatuses in view of the convenience of operating, the solidity of the apparatus, and the like are used. In a case of configuring the relay apparatuses 20 as dedicated apparatuses, each relay apparatuses 20 needs only to be able to execute only restricted programs necessary for the system of the present embodiment, and its hardware performance such as CPU performance and storage capacity does not need to be very high. Therefore, it is possible to configure each relay apparatus 20 as an inexpensive apparatus having a relatively small size. Also, since each relay apparatus does not execute unspecific programs which are not assumed in advance, failures are unlikely to occur, and thus the user side basically does not need to perform maintenance work. Also, since provision of information from the management service 30 to the user side is performed through the Internet, each relay apparatus 20 does not need to have a user interface (UI) such as a display screen or an input unit.

Also, each relay apparatus 20 may provide a function which is not inherent in corresponding management object apparatuses 14, as an additional function, to the corresponding management object apparatus 14. This provision of an additional function will be described below in detail.

The relay apparatuses 20 correspond to a protocol for using the management service apparatus 30 to remotely manage other apparatuses, and can use that protocol to perform communication with the management service apparatus 30. As this protocol for remote management, for example, TR-069 is known (however, the protocol for remote management is not limited to TR-069).

The management service 30 is provided on the Internet, and collects information of the individual management object apparatuses 14 from the relay apparatuses 20 located inside the management units 10 through the Internet, and uses the collected information to provide a service to the individual management units 10. The management service 30 may be a single server apparatus, or may be a system which is composed of a plurality of computers, like a cloud computing system. As an example of the service which the management service 30 provides, there is a service of providing information collected from a management unit 10 (such as the state or usage of the corresponding management unit 10), or two-dimensional information obtained by analyzing the collected information, to the administrator of the corresponding management unit 10. The administrator of a management unit 10 uses a mobile terminal 18, such as a smart phone or a tablet terminal, or a PC to log in to the management service 30 and view information on the corresponding management unit 10. Also, the management service 30 may provide one or more of a plurality of services including management on accounting for usage of each management object apparatus 14, management on the residual amounts or the like of consumables of each management object apparatus 14, distribution of the latest version of a device driver or firmware, and setting of various setting information in each management object apparatus 14. These services are just examples, and the management service 30 can provide various other services using the collected information.

The management service 30 has a database 32 for managing information on each management unit 10. In the database 32, various information such as information on the administrator of each management unit 10 (such as the user ID of the administrator), identification information (referred to as relay apparatus ID) of a relay apparatus 20 included in each management unit 10, and device information of each management object apparatus 14 included in each management unit 10 are registered.

FIG. 2 shows an example of data having been registered in the database 32. In this example, in the database 32, in association with the relay apparatus ID of each relay apparatus 20, the user ID (administrator ID) of an administrator who manages the relay apparatus 20, the name (group name) of a management unit 10 where the relay apparatus 20 has been installed, and the device information of each management object apparatus 14 included in the corresponding management unit 10 have been registered. In this example, as each administrator ID, the email address of a corresponding administrator has been used. Also, device information includes the name (printer name) and type (model) of a corresponding management object apparatus 14, a count value representing the number of print output sheets of the corresponding management object apparatus 14, and information (an information item "STATE") representing the operation state of the corresponding management object apparatus 14. Also, in the database 32, the address information of each relay apparatus 20 is contained in order to perform communication with the corresponding relay apparatus 20, but is not shown in FIG. 2 in order to avoid complexity.

In the example of FIG. 2, for example, a relay apparatus 20 having a relay apparatus ID "0001" has been registered in association with an administrator having a user ID "Yamamoto@example.com", and has been installed in a group (management unit) having a name "AB DEVELOPMENT DEPARTMENT ON THE SEVENTH FLOOR". Further, the corresponding relay apparatus 20 is connected to the local network 12 to which two management object apparatuses 14 having names "Printer-A" and "Printer-B" are connected, and the types (models) of the corresponding management object apparatuses 14 are "Prt123" and "Prt124", respectively. Furthermore, the management object apparatuses 14 having the names "Printer-A" and "Printer-B" have current state values "NORMAL" and "OUT OF TONER", respectively.

Also, in the example of FIG. 2, two management units 10 corresponding to two relay apparatus IDs "0001" and "0002" are managed by the same administrator having the administrator ID "Yamamoto@example.com".

In addition, the management service 30 also has a function as an operation screen providing apparatus for providing an operation screen (UI screen) to the management object apparatuses 14. The function as the operation screen providing apparatus will be described later.

An external server 40 is a server which is located outside the local networks 12 (for example, on the Internet), and provides an information processing service such as an image processing service to the management object apparatuses 14. The external server 40 is used in a linkage process to be described below. The linkage process using the external server 40 will be described below in detail.

The above described management service 30 collects information from each relay apparatus 20 using, for example, a remote management protocol. If a remote management protocol such as TR-069 is used, it is possible to use the management service 30 to control each relay apparatus 20 or perform information communication, through a firewall separating the local network 12 and the Internet from each other. Since the management object apparatuses 14 are separate from the external Internet by firewalls, they cannot directly transmit information to a destination system such as the management service 30 through the Internet. However, the management object apparatuses 14 can transmit their device information to the management service 30 through the relay apparatuses 20. Also, the remote management protocol may be used to use the management service 30 to update firmware or various setting information included in the relay apparatuses 20.

Also, in order to provide information to a management object apparatus 14 or any other apparatus (such as a PC 16) on a local network 12, the other the remote management protocol may be used to use the management service 30 to provide the information to a corresponding relay apparatus 20. In this case, the corresponding relay apparatus 20 may store the information, and provide the information to the management object apparatus 14 by a push scheme, or provide the information to the management object apparatus 14 by a pull scheme in response to a request from the management object apparatus 14. Examples of that provision information include a device driver (such as a printer driver) to be used for a PC 16 to controlling a management object apparatus 14, or update data of the device driver.

<Provision of Additional Function to Management Object Apparatus>

Until now, an example of the configuration of a system to which the present embodiment is applied has been described. Subsequently, an additional function which a relay apparatus 20 provides to a management object apparatus 14 will be described.

The additional function is a function which is not inherent in the management object apparatus 14 and can be provided by the relay apparatus 20. Examples of the additional function which the relay apparatus 20 provides to the management object apparatus 14 include a linkage process function. The linkage process function is a function of linking a process of the management object apparatus 14 with image processing of another apparatus. An example of the linkage process function is a function in which an image forming apparatus serving as the management object apparatus 14 generates image data by a scanning process, and the external server 40 located outside the local networks 12 (for example, on the Internet) performs an optical character recognition (OCR) process on the image data, thereby acquiring text data as the recognition result, and registers the text data in association with the original image data in a designated document management system. A process of linking a process of a management object apparatus 14 located in a local network 12 with another apparatus (for example, the external server 40) located outside the local networks 12 like in the above example is also referred to as an external linkage. Naturally, in a linkage process, it is possible to link a process of a management object apparatus 14 with another apparatus located in the same local network 12.

Examples of a system for making it possible to use an image forming apparatus to use a linkage process function include a system of the applicant of the present invention (hereinafter, referred to as a linkage system according to the related art) disclosed in Japanese Patent Application Laid-Open No. 2004-112636 or the like. This system uses data which is called a job order and defines a linkage process, to link an image forming apparatus and another apparatus. A linkage process of the present embodiment may be implemented using the same scheme as the system according to the related art. However, the mechanism of the linkage process disclosed in Japanese Patent Application Laid-Open No. 2004-112636 or the like is just one example, and it is natural that any other mechanism can be used. In FIG. 1, only one external server 40 is shown as an apparatus to be linked with a process of a management object apparatus 14. However, it is natural that a plurality of linkable apparatuses can exist. Also, it is possible to link a process of a management object apparatus 14 with processes of a plurality of apparatuses including the external server 40 and apparatuses located inside the local networks 12 like in a workflow.

In the above described linkage system according to the related art, the image forming apparatus corresponds to the linkage process. That is, the image forming apparatus can handle data defining a linkage process and called a job order, and has a function of generating a user interface (UI) screen according to the job order or requesting a linkage destination apparatus such as the external server 40 indicated in the job order to perform information processing if a user issues an instruction by operating the UI screen.

In contrast to this, according to an aspect of the present embodiment, a relay apparatus 20 provides a linkage process function which is not inherent in a management object apparatus 14, to the management object apparatus 14. In order to provide the linkage process function, for example, the relay apparatus 20 provides a user interface (UI) screen including a graphical user interface (GUI) component (for example, a button) for instructing a linkage process, to the management object apparatus 14. This GUI component is associated with a link to a linkage process to be performed in the relay apparatus 20. If the user touches the GUI component on the UI screen displayed on the display of the management object apparatus 14, the management object apparatus 14 transmits a request to a link destination (the linkage process function of the relay apparatus 20) indicated by the link. For example, a UI screen described in a standard language such as HyperText Markup Language (HTML) can be displayed by a management object apparatus 14 having a screen display function based on that standard. If the GUI component on the UI screen is touched, according to the link (uniform resource locator (URL)) associated with the GUI component, a HyperText Transfer Protocol (HTTP) request for calling the linkage process function is transmitted from the management object apparatus 14 to the relay apparatus 20. The called linkage process function of the relay apparatus 20 controls the relay apparatus 20 and another apparatus such as the external server 40, thereby implementing the linkage process function.

For example, it is considered a case where the user uses the UI screen on the management object apparatus 14 to instruct performance of a linkage process in which the management object apparatus 14 acquires image data by scanning an image, and external server 40 performs an OCR process on the image data, thereby acquiring text data, and stores the text data in the document management system located on the Internet. In this case, if receiving that instruction from the management object apparatus 14, the relay apparatus 20 instructs the management object apparatus 14 to scan a document and transmit an image as the scan result to the relay apparatus 20. If the scan result image is received as a response to the instruction, according to information (for example, a job order) defining the instructed linkage process, the relay apparatus 20 transmits the image to the external server 40 for OCR, and requests the external server 40 to perform an OCR process on the image. If the result data of the OCR is received as a response to the request, the relay apparatus 20 transmits the OCR result data to a document management system indicated in the information defining the linkage process, and registers the OCR result data in the document management system.

In a case of using the mechanism of the job-order-based linkage system according to the related art, the relay apparatus 20 processes a job order, thereby implementing a linkage process according to that job order. Since the management object apparatus 14 cannot perform any job order, the relay apparatus 20 processes the job order in place of the management object apparatus 14, and with respect to a process of the management object apparatus 14 represented in the job order, the relay apparatus 20 instructs the management object apparatus 14 to perform that process.

The additional function that the relay apparatus 20 can provide to the management object apparatus 14 is not limited to the above-described linkage process function. As the other example of the additional function, there are, for example, a function of recording a log (process history) and a function of providing browsing information of the recorded log.

The recording function of the log as the additional function which is provided to the management object apparatus 14 includes a function of recording the log regarding the process which the management object apparatus 14 performs and a function of recording the log regarding the process which the relay apparatus 20 performs for the management object apparatus 14. The log regarding the process which the management object apparatus 14 performs includes, for example, the number of sheets of the printing or copying performed by the management object apparatus 14, the time of performing, and information of the user (who instructs the copying etc.). The log regarding the process which the relay apparatus 20 performs for the management object apparatus 14 includes, for example, information regarding a communication which the relay apparatus 20 performs for the management object apparatus 14 (for example, the communication destination, communication time, period and communication contents). For example, in a case where the relay apparatus 20 communicates with the management service 30 or the external server 40 in response to a request (for example, the Web-UI display request or a linkage process performing request) from the management object apparatus 14, the relay apparatus 20 records information regarding that communication on the log. In order to identify the log information regarding each management object apparatus 14 under the control (the log information regarding the process that the management object apparatus 14 performs and the process that the relay apparatus 20 performs for the management object apparatus 14), the relay apparatus 20 includes the identification information (apparatus ID etc.) of the respectively corresponding management object apparatus 14 in each log information. The log recording function that the relay apparatus 20 provides as the additional function can be used as a function of recording the log by the relay apparatus 20 instead of the management object apparatus 14, for example, in a case where the storage capacity of the management object apparatus 14 is small.

In addition, as the function of providing the browsing information of the log, there is, for example, a function of providing the browsing information of displaying the log regarding the management object apparatus 14, which is recorded by the log recording function (the log regarding the process which the management object apparatus 14 performs and the process which the relay apparatus 20 performs for the management object apparatus 14), to the management object apparatus 14, in response to the request from the management object apparatus 14. In this case, the relay apparatus 20 may provide the browsing information including only the log information recorded in association with the identification information of the management object apparatus 14 which is the request source. In addition, the relay apparatus 20 may provide the browsing information of the log to the management service 30.

<Provision of UI for Additional Function>

Subsequently, a process of providing a UI screen for an additional function as described above to a management object apparatus 14 will be described with reference to FIG. 3.

Figure 3:
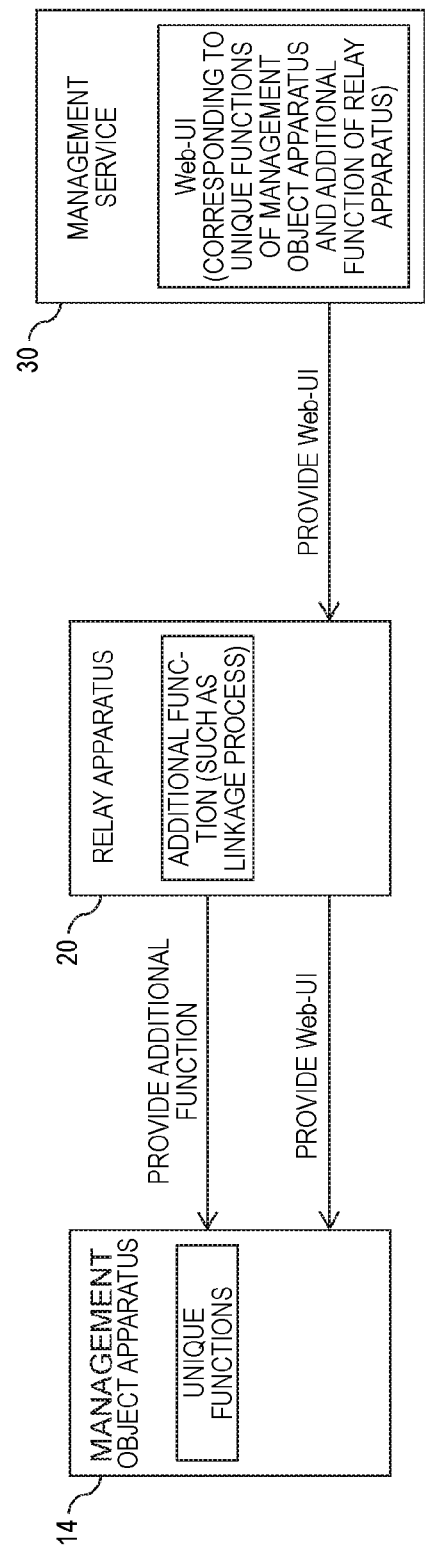
FIG. 3 is a view for explaining the outline of the UI screen providing method of the embodiment.

As shown in FIG. 3, a management object apparatus 14, for example, an image forming apparatus, has unique functions such as printing, scanning, copying, and facsimile transmission and reception. Here, the unique functions mean functions which are inherent in the management object apparatus 14. The management object apparatus 14 generates a UI screen for receiving a unique-function performance instruction, and displays the UI screen on its own display. The UI screen which is generated by the management object apparatus 14 and is for receiving a unique-function performance instruction hereinafter will be referred to as the "unique UI".

In contrast to this, an additional function which is provided from a relay apparatus 20 is not a function which is inherent in the management object apparatus 14, and thus the unique UI of the management object apparatus 14 does not have a means (such as a GUI component) for receiving an instruction to perform the additional function. For this reason, in the present embodiment, a UI screen usable to instruct performance of the additional function is provided from an apparatus which is external to the management object apparatus 14. Hereinafter, a case of using a World Wide Web (Web) technology to provide a UI screen from the external apparatus to the management object apparatus 14 will be described as an example, and this UI screen which is provided from the external apparatus will be referred to as a "Web-UI".

Especially, in this example, the management service 30 prepares a Web-UI including a UI for the unique functions of the management object apparatus 14 and a UI for the additional function which the relay apparatus 20 provides to the management object apparatus 14, and provides the Web-UI to the management object apparatus 14 through the relay apparatus 20. In order for this Web-UI provision, the management service 30 contains Web-UI data for each of the types, that is, models of the management object apparatuses 14, and if a request is received from a relay apparatus 20, the management service 30 provides a Web-UI corresponding to the type of a management object apparatus 14 which is an object. In general, unique functions and the display capabilities of displays (such as resolution and color/monochrome display) depend on the types of the management object apparatuses 14. Therefore, a Web-UI is prepared for each of the types of the management object apparatuses 14.

Subsequently, specific examples of a unique UI and a Web-UI in a case where a relay apparatus 20 provides an external linkage function to a management object apparatus 14 will be described with reference to FIGS. 4 and 5.

Figure 4:
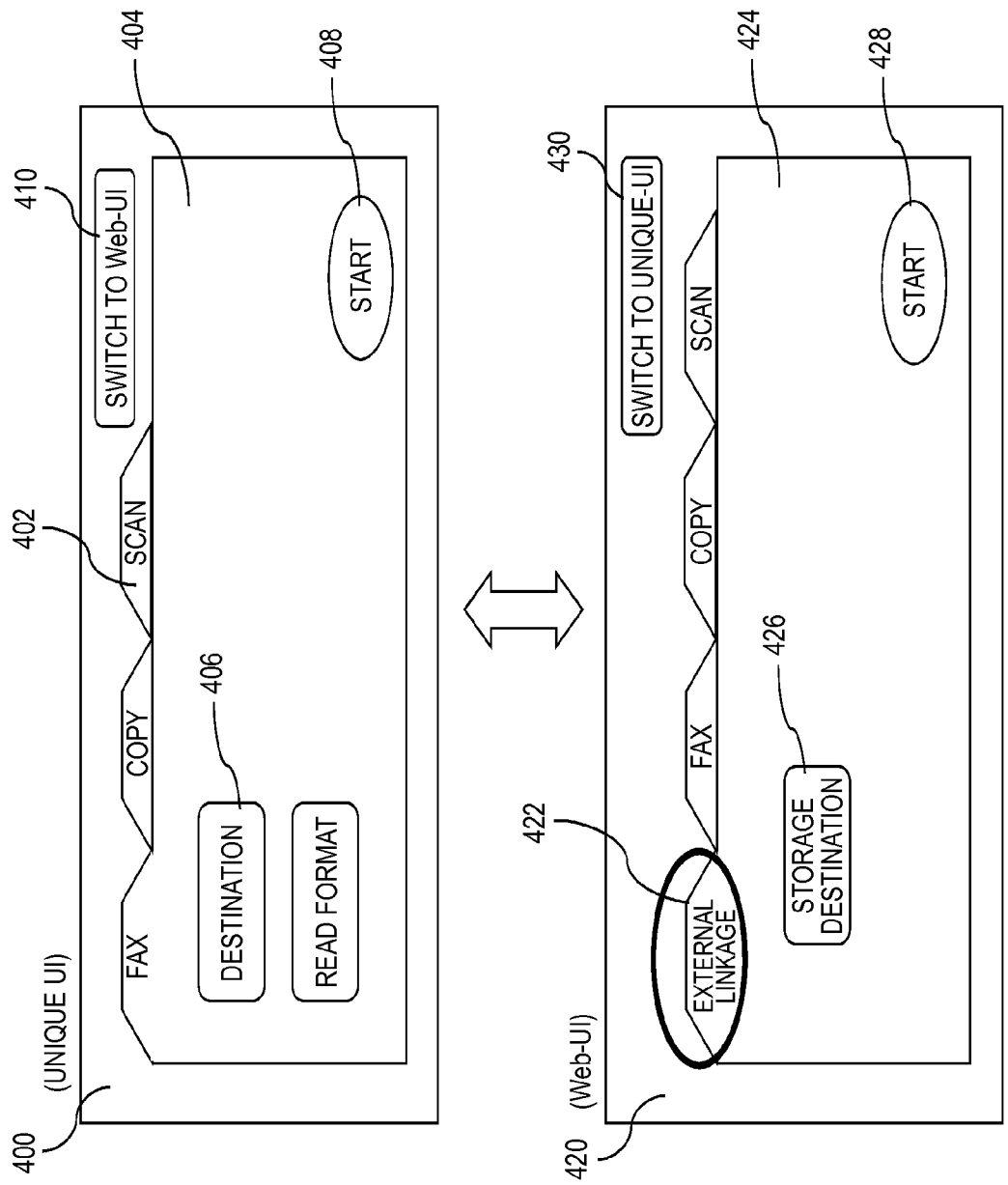
FIG. 4 is a view illustrating an example of a unique UI which is inherent in a management object apparatus, and an example of a Web-UI which is provided from the management service to the management object apparatus.
Figure 5:
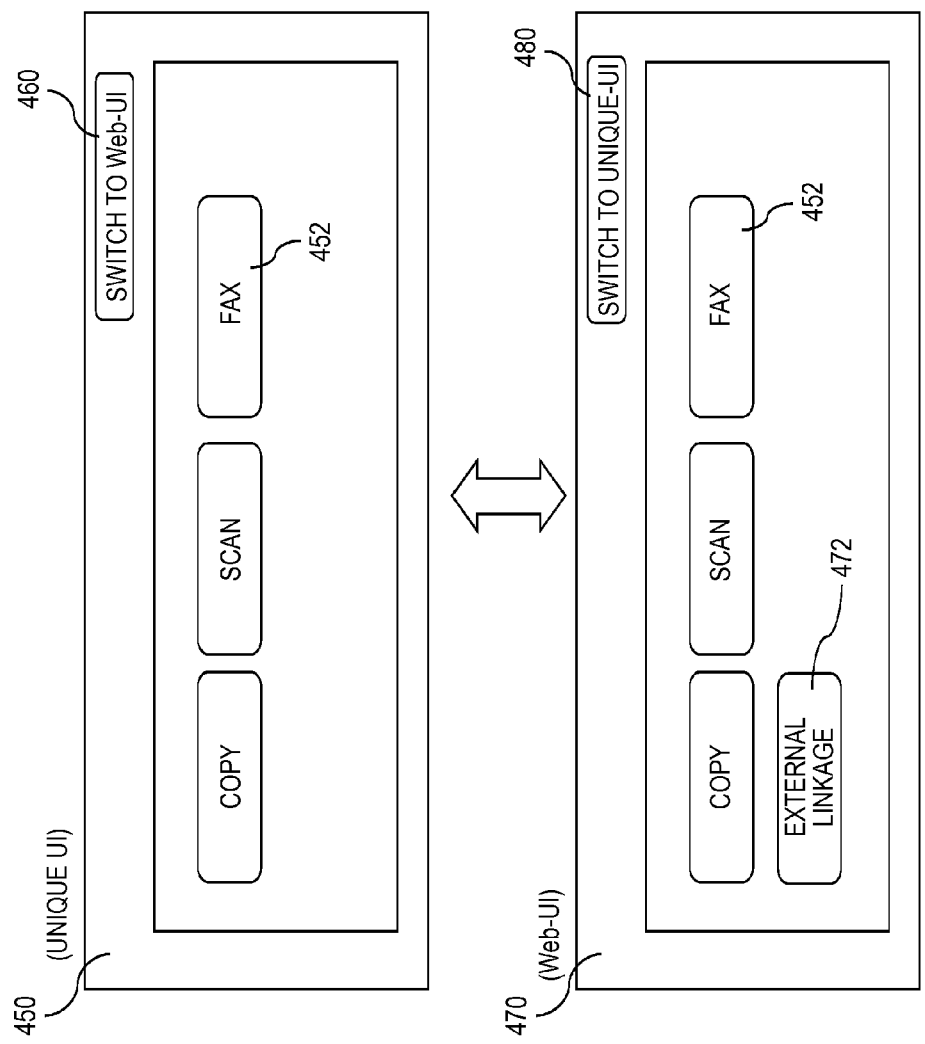
FIG. 5 is a view illustrating another example of the unique UI which is inherent in the management object apparatus, and another example of the Web-UI which is provided from the management service to the management object apparatus.

FIG. 4 shows a unique UI 400 and a Web-UI 420 of a management object apparatus 14 of a type "MULTI-FUNCTION APPARATUS A". The unique UI 400 has pages 404 with tabs 402 for unique functions "FAX", "COPY", and "SCAN". In each page 404, there is shown a button 406 usable to instruct various operations (such as setting or function performance start) relative to a corresponding function. In the example of FIG. 4, the page 404 of the "FAX"

function is displayed on the screen, and in the page 404 of the "FAX" function, there are shown a button 406 usable to call another screen for setting an item such as "DESTINATION" or "READ FORMAT", and a "START" button 408 usable to instruct start of FAX transmission. Also, the unique UI 400 includes a "SWITCH TO Web-UI" button 410 usable to call a Web-UI. If this button 410 is pushed, the management object apparatus 14 transmits a Web-UI display request to the relay apparatus 20. Then, if the relay apparatus 20 provides a Web-UI 420 in response to the Web-UI display request, the management object apparatus 14 displays the Web-UI 420.

The Web-UI 420 includes not only tabs 402 for the unique functions "FAX", "COPY", and "SCAN" of the type "MULTI-FUNCTION APPARATUS A" but also a tab 422 and a page 424 for the external linkage function which is provided by the relay apparatus 20. In this example, the external linkage function is a function in which the management object apparatus 14 acquires image data by scanning an image, and the relay apparatus stores the image data in any one of candidates for a predetermined storage destination apparatus located outside the local networks 12. An example of the storage destination apparatus is the external server 40 which is the linkage destination of the management object apparatus 14. The page 424 includes a "STORAGE DESTINATION" button 426 usable to select a storage destination apparatus, and a "START" button 428. If the "STORAGE DESTINATION" button 426 is pushed, a selection screen representing a list of storage destinations is displayed, and the user selects a storage destination for a current scan result image from the list displayed on the selection screen. After a storage destination is selected, if the "START" button 428 is pushed, an external linkage request (in this case, a data storage request to the external) including information on the selected storage destination is transmitted to the relay apparatus 20. The Web-UI 420 includes a "SWITCH TO UNIQUE UI" button 430 for receiving an instruction for switching the screen display to the unique UI. If the button 430 is pushed, the screen display of the management object apparatus 14 is switched from the Web-UI to the unique UI.

Until now, the unique UI and the Web-UI for the management object apparatus 14 of the type "MULTI-FUNCTION APPARATUS A" has been exemplified.

A management object apparatus 14 of a type "MULTI-FUNCTION APPARATUS B" has unique functions "FAX", "COPY", and "SCAN" like the type "MULTI-FUNCTION APPARATUS A". However, since the display area of the display of the type "MULTI-FUNCTION APPARATUS B" is smaller than that of the type "MULTI-FUNCTION APPARATUS A", the management object apparatus 14 of the type "MULTI-FUNCTION APPARATUS B" cannot display a large tap-switch-type screen as exemplified in FIG. 4. Although the management object apparatus 14 of the type "MULTI-FUNCTION APPARATUS B" can display a tap-switch-type screen, tabs and buttons become smaller and thus it is difficult to operate the screen. For this reason, as shown in FIG. 5, in a unique UI 450 for the type "MULTI-FUNCTION APPARATUS B", buttons 452 representing the functions "FAX", "COPY", and "SCAN" are displayed in a main screen. If any one of the buttons 452 is pushed (touched), the display is switched to another screen usable to input a detailed operation instruction relative to a unique function corresponding to the pushed button 452. In the screen of the type "MULTI-FUNCTION APPARATUS B", since the whole display area of the display is used to display the group of the buttons 452, it is easy to select a button 452.

Also, the unique UI 450 includes a "SWITCH TO Web-UI" button 460 for receiving an instruction to switch the screen display to a Web-UI.

A Web-UI 470 for the type "MULTI-FUNCTION APPARATUS B" includes not only buttons 452 representing the functions "FAX", "COPY", and "SCAN" (and detailed screens which are called by the buttons 452) but also an "EXTERNAL LINKAGE" button 472 usable to instruct an external linkage function. If the "EXTERNAL LINKAGE" button 472 is pushed, a detailed screen which is for an external linkage instruction and includes a "STORAGE DESTINATION" button and a "START" button like the Web-UI 420 of FIG. 4 is displayed. Also, the Web-UI 470 includes a "SWITCH TO UNIQUE UI" button 480 for receiving an instruction to switch the screen display to the unique UI.

In order for the UI screen provision mechanism described above, the management service 30 contains the correspondence relation between the types of the management object apparatuses 14 and the types of Web-UIs as shown in FIG. 6. A type "TYPE A" corresponds to the Web-UI 420 of FIG. 4, and a type "TYPE B" corresponds to the Web-UI 470 of FIG. 5. Also, the management service 30 has data (for example, HTML data) representing a Web-UI of each type.

<Flow of UI Screen Display Process>

Subsequently, an example of the flow of processes for displaying a UI screen in a management object apparatus 14 in the present embodiment and processes which are performed according to operations on the UI screen will be described with reference to FIG. 7.

(1) A relay apparatus 20 requests device information (such as information items "APPARATUS ID", "TYPE", "APPARATUS NAME", "OPTION COMPOSITION" (customized contents), and "STATE") from each management object apparatus 14 located on a local network 12 to which the corresponding relay apparatus 20 is connected. The relay apparatus 20 performs that request using, for example, a Simple Network Management Protocol (SNMP).

(2) Each management object apparatus 14 transmits its device information to the relay apparatus 20. For example, each management object apparatus 14 has a database called a Management Information Base (MIB), and contains its device information in the MIB, and updates the contents of the device information in response to a change in a state (for example, the number of output sheets). In response to the device information request from the relay apparatus 20, each management object apparatus 14 transmits the device information stored in the MIB. If the device information is acquired from each management object apparatus 14, the relay apparatus 20 stores the device information. The relay apparatus 20 may select information representing the correspondence relation between the item "APPARATUS ID" and the item "TYPE", from the device information of each management object apparatus 14, and store the selected information.

(3) The relay apparatus 20 transmits the device information of each management object apparatus 14 to the management service 30. At this time, the relay apparatus 20 may transmit the device information in association with its relay apparatus ID. If the device information of each management object apparatus 14 is received from the relay apparatus 20, the management service 30 registers the corresponding information in a section of the database 32 corresponding to the relay apparatus ID of the relay apparatus 20.

Also, in order to monitor a change in the state of each management object apparatus 14, the device information collecting process of the steps (1) to (3) is repeatedly performed, for example, regularly. If device information acquired in the second or subsequent device information collection relative to each management object apparatus 14 includes an item having a value different from that of device information stored in association with the corresponding management object apparatus 14 in the database 32, the management service 30 updates the stored value with the acquired value.

(4) Meanwhile, if a user issues a Web-UI switch instruction using the unique UI of a management object apparatus 14, the corresponding management object apparatus 14 transmits a Web-UI display request to a relay apparatus 20 located on the same local network 12. The Web-UI display request which is transmitted from the management object apparatus 14 to the relay apparatus 20 includes information on the apparatus ID or type (model) of the corresponding management object apparatus 14.

(5) If the Web-UI display request is received from the management object apparatus 14, the relay apparatus 20 specifies the type of the management object apparatus 14. In a case where the Web-UI display request does not include information on the type of the management object apparatus 14 and includes the apparatus ID, the relay apparatus 20 specifies the type of the corresponding management object apparatus 14 with reference to the correspondence relation between the item "APPARATUS ID" and the item "TYPE" acquired and stored in the step (2). Thereafter, the relay apparatus 20 transmits a Web-UI display request corresponding to the specified type, to the management service 30.

(6) The management service 30 reads data on a Web-UI corresponding to the type designated in the Web-UI display request from the relay apparatus 20, from a storage unit, and transmits the Web-UI data to the relay apparatus 20.

(7) If the Web-UI is received from the management service 30, the relay apparatus 20 transmits the Web-UI to the management object apparatus 14 which is the request source.

(8) The management object apparatus 14 displays the received Web-UI. The user inputs an operation instruction to the Web-UI. The operation instruction input to the Web-UI is transmitted to the relay apparatus 20.

(9) If the operation instruction is received from the Web-UI of the management object apparatus 14, the relay apparatus 20 analyzes the operation instruction, and transmits an action instruction to an apparatus necessary to perform a process corresponding to the operation instruction. For example, if the operation instruction is for instructing a process of the single management object apparatus 14 such as scanning or copying, the relay apparatus 20 instructs the management object apparatus 14 to perform the process according to the operation instruction. Meanwhile, if the operation instruction is for instructing a process of the external server 40, the relay apparatus 20 instructs the external server 40 to perform that process. For example, in a case where the operation instruction is for requesting a linkage process flow in which the management object apparatus 14 scans a document, thereby acquiring an image, and the external server 40 performs an OCR process on the image, thereby acquiring text data, and a predetermined document management system registers the text data, the relay apparatus 20 first instructs the management object apparatus 14 to perform scanning, thereby acquiring the scan result image, and then instructs the external server 40 to perform an OCR process on the scan result image, thereby acquiring the text data as the process result, and finally instructs the document management system to register the text data.

(10) For example, in a case where the instruction is transmitted to the external server 40, the external server 40 performs a process relative to the instruction, and then returns the process result to the relay apparatus 20. The returned process result is, for example, information representing whether the corresponding process has succeeded. Also, in a case where the relay apparatus 20 instructs the external server 40 to perform a substantial data generating process such as OCR or print data generation and instructs the management object apparatus 14 to perform a process (for example, printing of print data) on the process result of the external server 40, the external server 40 returns the substantial data as the process result to the relay apparatus 20.

(11) If the process result is received from the external server 40, the relay apparatus 20 provides the process result to the management object apparatus 14. For example, in a case where information on whether the corresponding process has succeeded is received as the process result, the relay apparatus 20 generates screen data for displaying the corresponding information, and provides the screen data to the management object apparatus 14. Meanwhile, in a case where substantial data such as image data is received as the process result, according to the process flow of the linkage process represented by the operation instruction input by the user in the step (8), the relay apparatus 20 instructs the management object apparatus 14 to perform a necessary process (for example, printing) on the substantial data.

<Examples of Functional Configurations of Apparatuses>

Subsequently, examples of the functional configurations of the apparatuses constituting the system of the present embodiment will be described with reference to FIG. 8.

Figure 8:
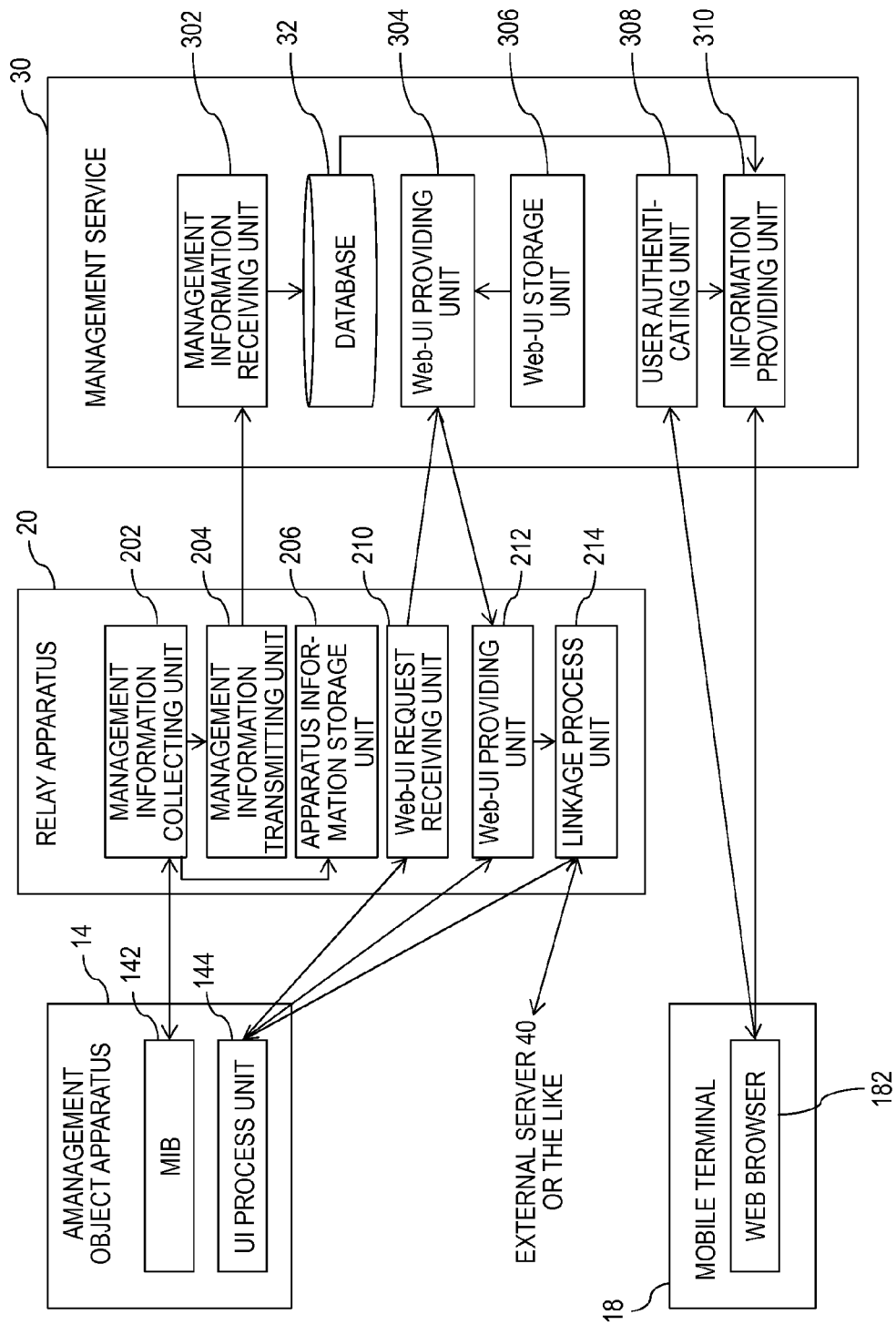
FIG. 8 is a view illustrating examples of the functional configurations of apparatuses constituting the system.

In the examples of FIG. 8, a management object apparatus 14 has a MIB 142 containing management information for managing the corresponding management object apparatus 14.

The management information includes various setting information such as information (such as items "ID", "NAME", and "TYPE NAME") specifying the management object apparatus 14, information (such as an item "FIRMWARE VERSION") specifying software installed in the management object apparatus 14, and information (such as an item "COUNT VALUE" and an item "OPERATION STATE" having a value "ACTIVE" OR "OUT OF ORDER") representing the state of the management object apparatus 14. The information of the MIB 142 can be referred to from another apparatus (for example, the relay apparatus 20) located on the same local network 12, and the relay apparatus 20 can rewrite a specific information item of the MIB information.

Also, the management object apparatus 14 has a UI process unit 144. The UI process unit 144 displays a UI screen on the display of the management object apparatus 14, and recognizes an input of the user on the UI screen, and requests the control unit of the management object apparatus 14 or the relay apparatus 20 to perform a process according to the input. During activation, the UI process unit 144 displays a unique UI stored therein. Thereafter, if the user instructs switching to a Web-UI, the UI process unit 144 transmits a Web-UI display request to the relay apparatus 20. If the relay apparatus 20 returns a Web-UI in response to the Web-UI display request, the UI process unit 144 displays the Web-UI on the display, and receives an input of the user on the Web-UI.

A mobile terminal 18 has a web browser 182. Using the web browser 182, a user (the administrator of a corresponding management unit) accesses to the log-in page of the management service 30 and performs user authentication. If the user authentication succeeds, the user can view a Web page provided by the management service 30 and representing information of individual management object apparatuses 14 included in the management unit being under the administration of the administrator.

A relay apparatus 20 includes a management information collecting unit 202, a management information transmitting unit 204, an apparatus information storage unit 206, a Web-UI request receiving unit 210, a Web-UI providing unit 212, and a linkage process unit 214.

The management information collecting unit 202 collects management information from management object apparatuses 14 (especially, for example, their MIBs 142) connected to the relay apparatus 20 through the local network 12, using a SNMP or the like. The management information transmitting unit 204 transmits the management information of the management object apparatuses 14 collected by the management information collecting unit 202, to the management service 30. The apparatus information storage unit 206 stores the information collected from each management object apparatus 14, for example, information on the correspondence relation between the apparatus ID and type of each management object apparatus 14.

The Web-UI request receiving unit 210 receives a Web-UI display request from a management object apparatus 14. In response to the Web-UI display request, the Web-UI request receiving unit 210 requests a Web-UI corresponding to the type of the corresponding management object apparatus 14, from the management service 30. The type of the management object apparatus 14 may be included in the display request from the management object apparatus 14, or may be acquired from information stored in the apparatus information storage unit 206, with reference to the apparatus ID included in the display request.

If a Web-UI is received, as a response of the request, from the management service 30, the Web-UI providing unit 212 provides the Web-UI to the management object apparatus 14 which is the request source. Also, if a user's instruction is input to the provided Web-UI, the Web-UI providing unit 212 receives the user's instruction from the management object apparatus 14, and performs a process corresponding to the instruction. For example, if the user's instruction is start of copying, the Web-UI providing unit 212 instructs the management object apparatus 14 to start copying.

Meanwhile, if the user's instruction is, for example, performance of an external linkage process, the Web-UI providing unit 212 requests the linkage process unit 214 to perform an external linkage process corresponding to the instruction. The linkage process unit 214 performs control on the above described linkage process. For example, according to the flow of the requested linkage process (this flow is described, for example, in a job order), the linkage process unit 214 instructs an apparatus being in charge of each processes constituting the flow (the management object apparatus 14, the external server 40, or the like) to perform the corresponding process. Also, if necessary, the linkage process unit 214 receives the process result and transmits the process result to an apparatus being in charge of the next process of the flow.

For example, it is assumed that on the "EXTERNAL LINKAGE" tab page 424 shown in the Web-UI 420 of FIG. 4, the user selects a storage destination by the "STORAGE DESTINATION" button 426, and pushes the "START" button 428. In this example, an external linkage is a process in which the management object apparatus 14 acquires image data by scanning an image, and the relay apparatus 20 stores the image data in the storage destination selected from predetermined candidates (various storage service on the Internet), and the relay apparatus 20 contains information (for example, a job order) defining that process. If the user pushes the "START" button 428, an external linkage process request including information on the storage destination selected by the user is transmitted from the UI process unit 144 to the Web-UI providing unit 212. If the external linkage process request is received, the Web-UI providing unit 212 requests the linkage process unit 214 to perform the external linkage process. According to the information such as a job order representing the contents of the external linkage process, the linkage process unit 214 first controls the management object apparatus 14 such that the management object apparatus 14 performs scanning, thereby acquiring a scan result image, and then transmits a request for registering a file containing the acquired image, to the external server 40 corresponding to the designated storage destination.

In the database 32 of the management service 30, the information on the individual relay apparatuses 20 exemplified in FIG. 2 is registered. A management information receiving unit 302 receives the management information from each management information transmitting unit 204 of the relay apparatus 20, and reflects the received management information in the information of the database 32 associated with the corresponding relay apparatus 20. For example, according to the item "COUNT VALUE" or "STATE" relative to each management object apparatus 14 and included in the received management information, the management information receiving unit 302 updates the item "COUNT VALUE" or "STATE" of the database 32 associated with the corresponding management object apparatus 14.

If the user accesses the management service 30 using the web browser 182 of a terminal such as a mobile terminal 18, a user authenticating unit 308 provides a log-in authentication screen to the user. If the user inputs authentication information such as a user name and a password to the authentication screen, the user authenticating unit 308 receives the input authentication information. Then, the user authenticating unit 308 performs authentication on the user, for example, by a known authentication process of checking the authentication information against user information registered in the management service 30. If it is determined by the authentication process that the user is a valid user registered in the management service 30, the user authenticating unit 308 allows an information providing unit 310 to provide information. The information providing unit 310 provides a management screen for the user. If the user inputs an instruction on the management screen, the information providing unit 310 provides management information which is included in the management information of the individual management object apparatuses 14 contained in the database 32 and for which the user has access authority as an administrator, or information obtained by analyzing the corresponding management information, for the user.

A Web-UI storage unit 306 stores data on a Web-UI corresponding to each of the types of the management object apparatuses 14. In response to a Web-UI display request from the relay apparatus 20, a Web-UI providing unit 304 reads data on a Web-UI corresponding to a type designated in the Web-UI display request, from the Web-UI storage unit 306, and transmits the read Web-UI data as a response to the relay apparatus 20.

The functions of the present system described with reference to FIGS. 1 to 7 are implemented by cooperation of the element group described with reference to FIG. 8.

Also, in the present embodiment, each relay apparatus 20 which collects device information for management from individual management object apparatuses 14 and transmits the device information to the management service 30 provides an additional function to each management object apparatus 14. Also, each relay apparatus 20 receives a Web-UI display request corresponding to the additional function. Since the device information which the relay apparatus 20 collects from each management object apparatus 14 includes information on the identification information (apparatus ID) and type of the corresponding management object apparatus 14, the relay apparatus 20 can store the correspondence relation between the identification information and type of the management object apparatus 14 according to the device information. If that correspondence relation is stored, even if a Web-UI display request from a management object apparatus 14 does not include information on the type of the management object apparatus 14, since each request (for example, a Web-UI display request) from the management object apparatus 14 to the relay apparatus 20 includes the identification information of the management object apparatus 14, the relay apparatus 20 can discriminate the type of the management object apparatus 14 with reference to the correspondence relation, and request a Web-UI corresponding to the type, from the management service 30.

<First Modification>

In the above described embodiment, the type of a Web-UI to be provided to a management object apparatus 14 is determined only according to the type of the corresponding management object apparatus 14. However, since a Web-UI includes a GUI component for an additional function which a relay apparatus 20 will provide to a management object apparatus 14, in a case where the relay apparatuses 20 can provide are different additional functions, it is not sufficient to consider only the type of a management object apparatus 14 in determining the type of a Web-UI. For example, like a case where the management service 30 uses a scheme of providing an additional function of a level according to a charging plan which each management unit 10 subscribes, to the corresponding management unit 10 through a relay apparatus 20, a case where additional functions (or combinations of a plurality of functions) which the relay apparatuses 20 can provide are different from one another may exist.

For this reason, in the present modification, the types of the relay apparatuses 20 are classified for combinations of additional functions which can be provided, and as shown in FIG. 9, for each combination of the types of the relay apparatuses 20 and the types of the management object apparatuses 14, a Web-UI type corresponding to the corresponding combination is determined. For example, the types of the relay apparatuses 20 may be classified into a type "RELAY 1" capable of providing only a first external linkage function in which the a management object apparatus 14 acquires an image by scanning and a relay apparatus 20 stores the image in an external storage destination, a type "RELAY 2" capable of providing only a second linkage process function in which a management object apparatus 14 acquire an image by scanning, and an external server 40 performs OCR on the image, thereby obtaining text data, and stores the text data together with the image in an external storage destination, and a type "RELAY 3" capable of providing both of the first and second external linkage functions. If a combination of the type of a relay apparatuses 20 and the type of a management object apparatus 14 is determined, first, a combination of an additional function which the relay apparatus 20 provides and the unique functions of the management object apparatus 14 is determined, and thus a combination of functions for which it is necessary to receive inputs by a Web-UI is determined. Also, if the type of the management object apparatus 14 is determined, a Web-UI format (such as a tab format exemplified in FIG. 4 or a small-area display format exemplified in FIG. 5) which can be displayed on the display of the management object apparatus 14 is determined. If the combination of functions for which it is necessary to receive inputs by a Web-UI, and the UI format which can be displayed are determined, specific Web-UI contents are determined and may be associated with a Web-UI type.

In the present modification, if a Web-UI display request is received from a management object apparatus 14, a relay apparatus 20 transmits a Web-UI display request including the type of the relay apparatus and the type of the management object apparatus 14, to the management service 30. The management service 30 acquires a Web-UI corresponding to the combination of both types included in the Web-UI display request, and returns data on the Web-UI to the relay apparatus 20.

<Second Modification>

In the above described embodiment, an additional function such as a linkage process function which is not inherent in a management object apparatus 14, and a Web-UI which is a UI screen for the additional function are provided from a relay apparatus 20 to the management object apparatus 14.

By the way, although a relay apparatus 20 has an additional function to be provided to a management object apparatus 14, the corresponding management object apparatus 14 may not be able to practically use the additional function due to its performance. As an example of that case, there is a case where complicated operations inappropriate for practical use are required, like a case where since the display area (number of pixels) of the display of a management object apparatus 14 is small, a UI for inputting a lot of input items necessary for an additional function which a relay apparatus 20 will provide is composed of a plurality of screens, and thus a user needs to perform inputting while performing switching between the plurality of screens. Also, in a case where an additional function which is provided is an external linkage function including an OCR process of the external server 40, if the resolution of the scanning function of a management object apparatus 14 is lower than a resolution necessary to sufficiently secure the accuracy of the OCR process of the external server 40, even if the external linkage function is provided to the management object apparatus 14, it is not practical. As described above, even if a relay apparatus 20 provides an additional function to a management unit 10 which is unable to practically use the additional function, it is useless. Therefore, in order to prevent confusion of a user, it is preferable that an UI for instructing performance of that additional function should not be provided.

For this reason, in the second modification, the management service 30 provides a Web-UI including a UI for an additional function which a relay apparatus 20 provides, to a management object apparatus 14 which is able to practically use the additional function, and provides a Web-UI which does not include a UI for the additional function, to a management object apparatus 14 which is unable to practically use the additional function. That is, in a case where a relay apparatus 20 provides an additional function (for example, an external linkage function), and a management object apparatus 14 is of a type capable of practically using the additional function, a Web-UI stored in association with the type of the management object apparatus 14 in the management service 30 includes a GUI component for the additional function. Otherwise, the Web-UI does not include any GUI component for the additional function. For example, in the example of FIG. 9, in a case where a management object apparatus 14 of a type "MULTI-FUNCTION APPARATUS A" has performance capable of practically using an additional function which a relay apparatus 20 of the type "RELAY 1" provides, whereas a management object apparatus 14 of a type "MULTI-FUNCTION APPARATUS B" does not have performance capable of practically using an additional function which a relay apparatus 20 of a type "RELAY 1" provides, a Web-UI of a type "TYPE1-A" includes a GUI component for the additional function, whereas a Web-UI of a type "TYPE1-B" does not include any GUI component for the additional function.

Thereafter, if an additional function which a management object apparatus 14 of the type "MULTI-FUNCTION APPARATUS B" can be use to practically use is developed, the Web-UI of the type "TYPE1-B" contained in the Web-UI storage unit 306 of the management service 30 is updated with a Web-UI including GUI components (a setting screen for the additional function, a button for calling that setting screen, and the like) corresponding to the developed additional function. For example, it is possible to consider a case where a function for which it is possible to perform setting simply or by a small number of operation steps even on the display of the type "MULTI-FUNCTION APPARATUS B" having a small display area such that a user can feels less stress is developed, and a case where a function which even a low-resolution reading apparatus of the type "MULTI-FUNCTION APPARATUS B" can perform, for example, a job linkage function in which a read scan image is simply stored in an external server, is added.

The update of the Web-UI may be performed manually by an administrator of the management service 30. Alternatively, the management service 30 automatically obtains information stored in the other external server and rewrite the existing Web-UI using that information to update the Web-UI.

<Third Modification>

A relay apparatus 20 may store a Web-UI acquired from the management service 30 such that the relay apparatus can reuse the Web-UI later. In this case, the relay apparatus 20 stores the Web-UI in association with the type of a corresponding management object apparatus 14. In this case, if a Web-UI display request is received from a management object apparatus 14, the relay apparatus 20 determines whether a Web-UI corresponding to the type of the corresponding management object apparatus 14 is contained in the corresponding relay apparatus 20, and if a corresponding Web-UI is contained in the relay apparatus 20, the relay apparatus 20 provides the corresponding Web-UI to the management object apparatus 14. In this case, the relay apparatus 20 does not transmit a Web-UI display request to the management service 30. Only in a case where any corresponding Web-UI is not contained in the relay apparatus 20, the relay apparatus 20 requests a Web-UI corresponding to the type, from the management service 30.

Also, in a case where the storage capacity of a relay apparatus 20 is limited, Web-UI storage may be managed as a cache of, for example, a least recently used (LRU) scheme.

<Fourth Modification>

In the above described embodiment, the management device 300 which collects and manages the device information of the individual management object apparatuses 14 manages and provides Web-UIs for the individual management object apparatuses 14. However, this is just one example. An apparatus or a system separate from the management service 30 may mange and provide Web-UIs. In this case, a relay apparatus 20 transmits device information collected from the management object apparatuses 14, to the management service 30, and if a Web-UI display request is received from a management object apparatus 14, the relay apparatus 20 requests a Web-UI for the corresponding management object apparatus 14, from the apparatus or the system managing Web-UIs on the Internet.

OTHERS

The relay apparatuses 20 and the management service 30 described above may each be implemented by causing a computer to execute a program representing the process of the function of each function module of the corresponding apparatus. The computer has a circuit configuration in which pieces of hardware, for example, a microcomputer such as a CPU, memories (primary storage devices) such as a random-access memory (RAM) and a read-only memory (ROM), a secondary storage controller that controls secondary storage devices (such as a hard disk drive (HDD), a solid state drive (SSD), and a flash memory), various input/output (I/O) interfaces, network interfaces that control wired or wireless connection with a network, etc. are connected via a bus, for example. A disk drive that reads data from and/or writes data into a portable disc recording medium such as a CD, a DVD, or a flexible disk, a memory reader/writer that reads data from and/or writes data into a portable non-volatile recording medium according to various standards such as a flash memory, etc. may be connected to the bus, for example, through input/output (I/O) interfaces. A program that describes the content of processes performed by the functional modules described above is stored in the secondary storage device to be installed on the computer by way of a recording medium such as a CD and a DVD or by way of a communication unit such as a network. The program stored in the secondary storage device is read by the RAM and executed by the microprocessor such as a CPU, whereby the group of functional modules described above is implemented.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An operation screen providing system comprising:
a relay apparatus and an operation screen providing apparatus, wherein the relay apparatus includes:
  a function providing unit configured to provide an additional function which is not inherent of a processing apparatus, to the processing apparatus,
  a requesting unit configured to provide, to the operation screen providing apparatus, a second request for an operation screen for the processing apparatus, in response to a first request for the operation screen being received from the processing apparatus; and
  a providing unit configured to provide, to the processing apparatus, operation screen information received from the operation screen providing apparatus in response to the second request for the operation screen,
wherein the operation screen providing apparatus includes a screen information providing unit configured to provide, in response to the second request for the operation screen being received from the relay apparatus, if the processing apparatus has performance capable of using the additional function, the operation screen information including screen information for receiving an instruction relative to a function of the processing apparatus and screen information for receiving an instruction relative to the additional function which the relay apparatus provides, to the relay apparatus,
wherein the requesting unit of the relay apparatus is further configured to transmit type information of the processing apparatus which is a request source of the operation screen request, to the operation screen providing apparatus together with the second request for the operation screen,
wherein the operation screen providing apparatus further includes a screen information storage unit configured to store, for each type of processing apparatus, the operation screen information including screen information corresponding to a function of the type of the processing apparatus, and screen information for receiving an instruction relative to the additional function which the relay apparatus provides, and
wherein the screen information providing unit is further configured to acquire the operation screen information relative to a type of the processing apparatus represented by the type information received together with the second request for the operation screen from the requesting unit of the relay apparatus, from the screen information storage unit, and provides the operation screen information to the relay apparatus.

2. The operation screen providing system according to claim 1,
  wherein the relay apparatus is connected to a local network to which the processing apparatus is connected and which is separated from an external network to which the operation screen providing apparatus is connected, by a firewall,
  wherein the relay apparatus further includes:
    a management information transmitting unit configured to acquire management information for managing the processing apparatus, the management information including identification information, the type information, and state information of the processing apparatus, from the processing apparatus, and transmit the acquired management information to a management service system connected to the external network, through the firewall; and
    a correspondence relation storage unit configured to store a correspondence relation between the identification information and the type of the processing apparatus, on the basis of the management information acquired by the management information transmitting unit from the processing apparatus, and
  wherein in response to the first request for the operation screen being received from the processing apparatus, the requesting unit of the relay apparatus is further configured to acquire a type of the processing apparatus corresponding to the identification information of the processing apparatus, from the correspondence relation storage unit, and transmit the acquired type information to the operation screen providing apparatus together with the second request for the operation screen.

3. The operation screen providing system according to claim 1,
  wherein in response to the second request for the operation screen being received from the relay apparatus, if the processing apparatus has performance incapable of using the additional function, the screen information providing unit is further configured to provide information which does not include the screen information for receiving the instruction relative to the additional function as the operation screen information, to the relay apparatus.

4. A relay apparatus comprising:
  a function providing unit configured to provide an additional function which is not inherent of a processing apparatus, to the processing apparatus;
  a requesting unit configured to provide, to an operation screen providing apparatus, a second request for an operation screen for the processing apparatus, in response to a first request for the operation screen being received from the processing apparatus; and
  a providing unit configured to receive, from the operation screen providing apparatus, operation screen information including screen information for receiving an instruction relative to a function of the processing apparatus and screen information for receiving an instruction relative to the additional function which the relay apparatus provides, in response to the second request for the operation screen being provided to the operation screen providing apparatus, if the processing apparatus has performance capable of using the additional function, and provide the received operation screen information to the processing apparatus,
  wherein if the processing apparatus has performance incapable of using the additional function, the requesting unit is further configured to receive, from the operation screen providing apparatus, information which does not include the screen information for receiving the instruction relative to the additional function as the operation screen information.

5. An operation screen providing method of a relay apparatus, the method comprising:
  providing an additional function which is not inherent of a processing apparatus, to the processing apparatus;
  requesting, from an operation screen providing apparatus, an operation screen for the processing apparatus, in response to a request for the operation screen being received from the processing apparatus; and
  receiving, from the operation screen providing apparatus, operation screen information including screen information for receiving an instruction relative to a function of the processing apparatus and screen information for receiving an instruction relative to the additional function which the relay apparatus provides, in response to the requesting, if the processing apparatus has performance capable of using the additional function, and providing the received operation screen information to the processing apparatus, wherein if the processing apparatus has performance incapable of using the additional function, receiving from the operation screen providing apparatus, information which does not include the screen information for receiving the instruction relative to the additional function as the operation screen information.

6. A non-transitory computer readable medium storing a program for causing a computer to functions as:
 a function providing unit that provides an additional function which is not inherent of a processing apparatus, to the processing apparatus;
 a requesting unit that provides, to an operation screen providing apparatus, a second request for an operation screen for the processing apparatus, in response to a first request for the operation screen being received from the processing apparatus; and
 a providing unit that receives, from the operation screen providing apparatus, operation screen information including screen information for receiving an instruction relative to a function of the processing apparatus and screen information for receiving an instruction relative to the additional function which the computer provides, in response to the second request for the operation screen being provided to the operation screen providing apparatus, if the processing apparatus has performance capable of using the additional function, provides the received operation screen information to the processing apparatus, wherein if the processing apparatus has performance incapable of using the additional function, the requesting unit is further configured to receive, from the operation screen providing apparatus, information which does not include the screen information for receiving the instruction relative to the additional function as the operation screen information.

7. An operation screen providing apparatus comprising:
 a screen information providing unit configured to provide, in response to receiving a request for an operation screen for a processing apparatus from a relay apparatus which provides an additional function which is not inherent of the processing apparatus to the processing apparatus, operation screen information including screen information for receiving an instruction relative to a function of the processing apparatus and screen information for receiving an instruction relative to the additional function which the relay apparatus provides, to the relay apparatus, such that the operation screen information is provided to the processing apparatus, wherein the operation screen providing apparatus is further configured to receive, from the relay apparatus, type information of the processing apparatus together with the request the operation screen, wherein the operation screen providing apparatus further includes a screen information storage unit configured to store, for each type of processing apparatus, the operation screen information including screen information corresponding to a function of the type of the processing apparatus, and screen information for receiving an instruction relative to the additional function which the relay apparatus provides, and wherein the screen information providing unit is further configured to acquire the operation screen information relative to a type of the processing apparatus represented by the type information received together with the request for the operation screen from the relay apparatus, from the screen information storage unit, and provides the operation screen information to the relay apparatus.

8. An operation screen providing method of an operation screen providing apparatus, the method comprising:
 providing, in response to receiving a request for an operation screen for a processing apparatus from a relay apparatus which provides an additional function which is not inherent of the processing apparatus to the processing apparatus, operation screen information including screen information for receiving an instruction relative to a function of the processing apparatus and screen information for receiving an instruction relative to the additional function which the relay apparatus provides, to the relay apparatus, such that the operation screen information is provided to the processing apparatus;
 receiving, from the relay apparatus, type information of the processing apparatus together with the request for the operation screen;
 storing, in a screen information storage unit, for each type of processing apparatus, the operation screen information including screen information corresponding to a function of the type of the processing apparatus, and screen information for receiving an instruction relative to the additional function which the relay apparatus provides;
 acquiring the operation screen information relative to a type of the processing apparatus represented by the type information received together with the request for the operation screen from the relay apparatus, from the screen information storage unit; and
 providing the operation screen information to the relay apparatus.

9. A non-transitory computer readable medium storing a program for causing a computer to function as:
 a screen information providing unit that provides, in response to receiving a request for an operation screen for a processing apparatus together with type information of the processing apparatus from a relay apparatus which provides an additional function which is not inherent of the processing apparatuses to the processing apparatus, operation screen information including screen information for receiving an instruction relative to a function of the processing apparatus and screen information for receiving an instruction relative to the additional function which the relay apparatus provides, to the relay apparatus, such that the operation screen information is provided to the corresponding processing apparatus; and
 a screen information storage unit that stores, for each type of processing apparatus, the operation screen information including screen information corresponding to a function of the type of the processing apparatus, and screen information for receiving an instruction relative to the additional function which the relay apparatus provides, wherein the screen information providing unit further acquires the operation screen information relative to a type of the processing apparatus represented by the type information received together with the request for the operation screen from the relay apparatus, from the screen information storage unit, and provides the operation screen information to the relay apparatus.

* * * * *